United States Patent
Lee et al.

(10) Patent No.: US 9,580,596 B2
(45) Date of Patent: Feb. 28, 2017

(54) CHEMICAL RESISTANT POLYMER COMPOSITION FOR A CENTER FASCIA

(71) Applicants: HYUNDAI MOTOR COMPANY, Seoul (KR); SK CHEMICALS CO., LTD., Seongnam-si, Gyeonggi-do (KR)

(72) Inventors: Han Ki Lee, Hwaseong-si (KR); Dae Sik Kim, Yongin-si (KR); Jung Gyun Noh, Anyang-si (KR); Dong-Cheol Sohn, Goyang-si (KR); Kye Yune Lee, Suwon-si (KR); Jong-Wook Shin, Suwon-si (KR)

(73) Assignees: SK CHEMICALS CO., LTD., Seongnam-si, Gyeonggi-Do (KR); HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/930,573

(22) Filed: Nov. 2, 2015

(65) Prior Publication Data

US 2016/0122537 A1 May 5, 2016

(30) Foreign Application Priority Data

Oct. 31, 2014 (KR) .................. 10-2014-0150404

(51) Int. Cl.
| | | |
|---|---|---|
| *C08L 69/00* | (2006.01) | |
| *C08K 5/524* | (2006.01) | |
| *C08L 51/04* | (2006.01) | |
| *C08L 51/08* | (2006.01) | |
| *C08L 55/02* | (2006.01) | |
| *C08L 67/02* | (2006.01) | |

(52) U.S. Cl.
CPC ............ *C08L 69/00* (2013.01); *C08K 5/524* (2013.01); *C08L 51/04* (2013.01); *C08L 51/085* (2013.01); *C08L 55/02* (2013.01); *C08L 67/02* (2013.01); *C08L 67/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,485,819 B2 * | 11/2002 | Hayes | ............ | B32B 27/06 |
| | | | | 428/221 |
| 2015/0368460 A1 * | 12/2015 | Sohn | ............ | C08L 55/02 |
| | | | | 524/504 |

FOREIGN PATENT DOCUMENTS

| | | |
|---|---|---|
| EP | 0249964 A2 | 12/1987 |
| EP | 2955204 A1 | 12/2015 |
| JP | 06-016887 A | 1/1994 |
| JP | 2006-160919 A | 6/2006 |
| JP | 2013-082942 A | 5/2013 |
| JP | 2015-113464 A | 6/2015 |
| KR | 10-2013-0044867 A | 5/2013 |
| WO | 2012/031054 A1 | 3/2012 |
| WO | 2014/123373 A1 | 8/2014 |
| WO | 2014/208956 A1 | 12/2014 |

OTHER PUBLICATIONS

Extended European Search Report dated Feb. 26, 2016, issued in European Patent Application No. 15187105.0.

* cited by examiner

*Primary Examiner* — Vickey Nerangis
(74) *Attorney, Agent, or Firm* — McDermott Will & Emery LLP

(57) ABSTRACT

A chemical resistant polymer composition for a center fascia includes a resin composition consisting of 10 to 20% by weight of a polyester copolymer containing a residue of a dicarboxylic acid component containing terephthalic acid and a residue of a diol component containing dianhydrohexitoll; 15 to 25% by weight of polytrimethyleneterephthalate; 10 to 20% by weight of one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and 50 to 65% by weight of polycarbonate based on the weight of the resin composition. The polymer composition further comprises 0.1 to 10 parts by weight of a phosphite-based antioxidant, based on 100 parts by weight of the resin composition.

17 Claims, No Drawings

CHEMICAL RESISTANT POLYMER COMPOSITION FOR A CENTER FASCIA

CROSS-REFERENCE TO RELATED APPLICATION

This application claims the benefit of priority to Korean Patent Application No. 10-2014-0150404, filed on Oct. 31, 2014 with the Korean Intellectual Property Office, the disclosure of which is herein incorporated by reference in its entirety.

TECHNICAL FIELD

The present disclosure relates to a chemical resistant polymer composition for a center fascia, and more particularly, to a highly heat resistant polymer composition capable of providing an environmentally friendly biomass-containing synthetic resin exhibiting improved chemical resistance without chemical cracking upon contact with a car air freshener.

BACKGROUND

Polyester resins are widely used in reinforced plastics, paints, films, and resins for molding, and are also used as fabric materials to produce clothing due to characteristics of superior heat resistance, mechanical strength and elastic strength.

The use of polyester resins in the fields of interior building materials or molded sign panels is increasing because of the characteristic physical properties. However, polyester resins have lower heat resistance than other polymer materials, for example acrylic materials or polycarbonate materials, and thus there is a problem that polyester resins are not suitable for exterior building subject to large seasonal temperature changes.

Polycarbonate resins are used in a variety of building materials and housings for electronic products, packaging materials, cases, boxes, and interior/exterior building materials due to excellent properties of impact resistance and heat resistance. Demands for such polycarbonate resins are increasing because of these properties. However, problems with their use may include discoloration or cracking of polycarbonate products due to cleaners, cosmetics, hand sanitizers, or various household chemicals.

There have been many attempts to solve the problems of polyester resins and polycarbonate resins, and studies on blending of the polyester resins with the polycarbonate resins have been conducted.

Further, a technique of improving impact resistance and heat resistance by blending an acrylonitrile-butadiene-styrene-based graft copolymer (ABS) with a polycarbonate resin has been developed, but the product is not an environmentally friendly biomass product. Since the polyester resin and the polycarbonate resin are different in terms of melting point and molecular structure, it is difficult to improve heat resistance only by simple blending the two. Further, many methods have been used in order to improve chemical resistance while maintaining the mechanical properties of polycarbonate, particularly heat resistance, but the improvement of chemical resistance has not progressed enough to be industrially practical. Additionally, a method of further blending the two with other materials has been attempted in order to improve heat resistance and chemical resistance, but this did not obtain satisfactory chemical resistance.

Among automobile interior materials, PC/ABS (Polycarbonate/ABS) is an engineering plastic generally used for center fascias. By combining the excellent heat resistance, impact resistance, and self-extinguishing properties of PC and processability and economic advantages of ABS, PC/ABS has been developed for center fascias that require high heat resistance, impact resistance, and painting properties. In terms of chemical resistance, PC/ABS is susceptible to most chemicals, such as aromatic hydrocarbons, ketones, aldehydes, alcohols, and terpenes (limonene, etc.). When PC/ABS is directly exposed to these chemicals for a long period of time, discoloration, swelling, and cracking occur and deteriorate the value of the product. Further, the material has safety problems if used as a material in a head impact zone. Therefore, many studies have been conducted to prepare a polymer composition having superior chemical resistance to the conventional PC/ABS. For example, it was reported that polyolefin-based resins having excellent chemical resistance were mixed and used in order to improve chemical resistance of PC/ABS. However, there are problems such that a block copolymer must be used as a compatibilizer in order to improve compatibility of incompatible materials, and phase separation occurs when practically applied, leading to a rapid reduction in mechanical properties.

Accordingly, there is a need for a chemical resistant polymer composition for center fascia which is capable of providing a resin having excellent resistance to environmental stress cracking against car air fresheners, and improved heat resistance and/or impact resistance.

SUMMARY OF THE DISCLOSURE

The present disclosure relates to a chemical resistant polymer composition for center fascia, and more particularly, to a highly heat resistant polymer composition capable of providing an environmentally friendly biomass-containing synthetic resin which exhibits improved chemical resistance without chemical cracking upon contact with a car air freshener, etc.

The present disclosure provides a chemical resistant polymer composition for a center fascia, which includes a resin composition consisting of 10 to 20% by weight of a polyester copolymer containing a residue of a dicarboxylic acid component containing terephthalic acid and a residue of a diol component containing dianhydrohexitol; 15 to 25% by weight of polytrimethyleneterephthalate; 10 to 20% by weight of one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and 50 to 65% by weight of polycarbonate. The polycarbonate composition further includes 0.1 to 10 parts by weight of a phosphite-based antioxidant, based on 100 parts by weight of the resin composition.

The polyester copolymer has a weight average molecular weight of 50,000 to 60,000, and a glass transition temperature of 105 to 125° C.

In the polyester copolymer, the dicarboxylic acid component may further include one or more selected from the group consisting of aromatic dicarboxylic acids having 8 to 20 carbon atoms and aliphatic dicarboxylic acids having 4 to 20 carbon atoms.

In the polyester copolymer, the dianhydrohexitol may be isosorbide, and the content of dianhydrohexitol may be 5 to 60 mol %, based on the total content of the diol component.

Further, in the polyester copolymer, the diol component may further include one or more selected from the group consisting of compounds represented by the following Chemical Formulae 1, 2, and 3:

[Chemical Formula 1]

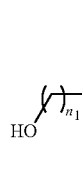

wherein $R_1$, $R_2$, $R_3$ and $R_4$ are each independently hydrogen or a substituted or unsubstituted alkyl group having 1 to 5 carbon atoms, and $n_1$ and $n_2$ are each independently an integer of 0 to 3;

[Chemical Formula 2]

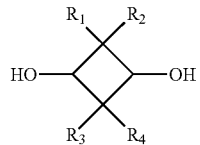

wherein $R_1$, $R_2$, $R_3$ and $R_4$ are each independently hydrogen or a substituted or unsubstituted alkyl group having 1 to 5 carbon atoms;

[Chemical Formula 3]

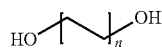

wherein n is an integer of 1 to 7.

In the polyester copolymer, the diol component may further include 1,4-cyclohexanediol and ethylene glycol.

The polytrimethyleneterephthalate may have Intrinsic Viscosity of 0.8 to 1.0.

The unsaturated nitrile-diene-based rubber-aromatic vinyl graft copolymer may be a core-shell rubber, in which its average particle size may be 0.1 to 5 µM, its graft ratio may be 5 to 90%, a glass transition temperature of the core may be −20° C. or lower, and a glass transition temperature of the shell may be 20° C. or higher.

In the unsaturated nitrile-diene-based rubber-aromatic vinyl graft copolymer, the unsaturated nitrile may be one or more selected from the group consisting of acrylonitrile, methacrylonitrile, ethacrylonitrile, phenylacrylonitrile, and α-chloroacrylonitrile, and in the graft copolymer, the diene-based rubber may be a butadiene-type rubber or an isoprene-type rubber.

Furthermore, in the graft copolymer, the aromatic vinyl may be one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

The alkylmethacrylate-diene-based rubber-aromatic vinyl graft copolymer may be a methyl methacrylate-butadiene-styrene graft copolymer.

The polycarbonate may have a glass transition temperature of 130 to 160° C. and a weight average molecular weight of 20,000 to 60,000.

The polymer composition may further include one or more selected from the group consisting of an unsaturated nitrile-aromatic vinyl-glycidyl methacrylate-based compatibilizer and an unsaturated nitrile-aromatic vinyl-maleic anhydride-based compatibilizer.

The phosphite-based antioxidant may be represented by the following Chemical Formula 6:

[Chemical Formula 6]

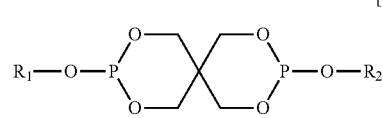

wherein $R_1$ and $R_2$ are each independently a substituted or unsubstituted alkyl group having 1 to 40 carbon atoms or a substituted or unsubstituted aryl group having 6 to 40 carbon atoms.

The chemical resistant polymer composition for center fascia may further include one or more additives selected from the group consisting of a lubricant, a phenolic primary antioxidant, and a phosphite-based secondary antioxidant.

According to the present disclosure, a chemical resistant polymer composition for center fascia may provide a highly heat resistant polymer composition which is environmentally friendly and also exhibits improved chemical resistance without chemical cracking upon contact with a car air freshener, etc., and a synthetic resin or a resin molded article obtained by using the composition.

DETAILED DESCRIPTION

While the present disclosure is susceptible to various modifications and alternative forms, specific exemplary embodiments thereof are herein described in detail. It should be understood, however, that the description thereof is not intended to limit the present disclosure to the particular forms disclosed, but, on the contrary, the present intention is to cover all modifications, equivalents, and/or alternatives that fall within the spirit and scope of the present disclosure. In the present specification, if it is determined that a detailed description of related art unnecessarily makes the gist of the present disclosure unclear, the detailed description thereof will be omitted.

The present disclosure provides a chemical resistant polymer composition for a center fascia, which includes a resin composition consisting of 10 to 20% by weight of a polyester copolymer containing a residue of a dicarboxylic acid component containing terephthalic acid and a residue of a diol component containing dianhydrohexitol; 15 to 25% by weight of polytrimethyleneterephthalate; 10 to 20% by weight of one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and 50 to 65% by weight of polycarbonate. The polymer composition further includes 0.1 to 10 parts by weight of a phosphite-based antioxidant, based on 100 parts by weight of the resin composition.

Hereinafter, the polymer composition according to specific embodiments of the present disclosure will be described in more detail.

According to an embodiment of the present disclosure, provided is a chemical resistant polymer composition for a center fascia is provided which includes a resin composition consisting of 10 to 20% by weight of a polyester copolymer containing a residue of a dicarboxylic acid component containing terephthalic acid and a residue of a diol component containing dianhydrohexitol; 15 to 25% by weight of polytrimethyleneterephthalate; 10 to 20% by weight of one or more copolymers selected from the group consisting of an unsaturated nitrile-diene-based rubber-aromatic vinyl graft copolymer, an alkyl methacrylate-diene-based rubber-aromatic vinyl graft copolymer, and an alkylmethacrylate-silicone/alkylacrylate graft copolymer; and 50 to 65% by weight of polycarbonate. The polymer composition further includes 0.1 to 10 parts by weight of a phosphite-based antioxidant, based on 100 parts by weight of the resin composition.

A technique of improving impact resistance and heat resistance by blending an acrylonitrile-butadiene-styrene graft copolymer (ABS) with a polycarbonate resin has been developed, but the product has poor chemical resistance or resistance to environmental stress cracking and is not an environment-friendly biomass product.

Accordingly, a polymer composition consisting of a particular polyester copolymer; polytrimethyleneterephthalate; one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and polycarbonate may exhibit physical properties of high heat resistance and improved chemical resistance.

In the preparation process of the polymer composition, a method and an apparatus generally used in the preparation of a blend or mixture of polymers may be used without limitation. For example, the polyester copolymer; one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; polytrimethyleneterephthalate; and polycarbonate may be injected to a general blender, mixer, or tumbler, and blended with each other by a twin-screw kneading extruder so as to prepare the polymer composition. In the preparation process of the polymer composition, respective resins that are sufficiently dried are preferably used.

Moreover, the polymer composition may include polytrimethyleneterephthalate, resulting in an improvement of chemical resistance.

The polymer composition may include a resin composition consisting of 10 to 20% by weight of a polyester copolymer containing a residue of a dicarboxylic acid component containing terephthalic acid and a residue of a diol component containing dianhydrohexitol; 15 to 25% by weight of polytrimethyleneterephthalate; 10 to 20% by weight of one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and 50 to 65% by weight of polycarbonate. The polymer composition may further include 0.1 to 10 parts by weight of a phosphite-based antioxidant, based on 100 parts by weight of the resin composition.

As used herein, the term 'residue' means a moiety or unit, which is contained in the product of a chemical reaction of a specific compound and is derived from the specific compound. For example, each of the residue of the dicarboxylic acid component and residue of the diol component means either a moiety derived from the dicarboxylic acid component or the diol component of polyester formed by esterification or polycondensation.

The 'dicarboxylic acid component' indicates that it includes dicarboxylic acid such as terephthalic acid, an alkyl ester thereof (e.g., a lower alkyl ester having 1 to 4 carbon atoms such as monomethyl, monoethyl, dimethyl, diethyl or dibutyl ester), and/or an acid anhydride thereof, and may react with the diol component to form a dicarboxylic acid moiety such as terephthaloyl moiety.

The dicarboxylic acid component used in the polyester synthesis contains terephthalic acid, thereby improving physical properties of the polyester resin to be prepared, such as heat resistance, chemical resistance or weather resistance (e.g., prevention of a reduction in the molecular weight or yellowing due to ultraviolet radiation).

The dicarboxylic acid component may further include an aromatic dicarboxylic acid component, an aliphatic dicarboxylic acid component, or a mixture thereof as other dicarboxylic acid components. In this regard, 'other dicarboxylic acid component' is a component excluding terephthalic acid, among the dicarboxylic acid components.

Meanwhile, in the polyester copolymer, the dicarboxylic acid component may further include one or more selected from the group consisting of aromatic dicarboxylic acids having 8 to 20 carbon atoms and aliphatic dicarboxylic acids having 4 to 20 carbon atoms.

The aromatic dicarboxylic acid component may be aromatic dicarboxylic acid having 8 to 20 carbon atoms, preferably 8 to 14 carbon atoms, or a mixture thereof. Examples of the aromatic dicarboxylic acid may include isophthalic acid, naphthalene dicarboxylic acid such as 2,6-naphthalene dicarboxylic acid, diphenyl dicarboxylic acid, 4,4'-stilbene dicarboxylic acid, 2,5-furan dicarboxylic acid, 2,5-thiophene dicarboxylic acid, but specific examples of the aromatic dicarboxylic acid are not limited thereto.

The aliphatic dicarboxylic acid component may be an aliphatic dicarboxylic acid having 4 to 20 carbon atoms in some embodiments and 4 to 12 carbon atoms in other embodiments, or a mixture thereof. Examples of the aliphatic dicarboxylic acid include cyclohexanedicarboxylic acid such as 1,4-cyclohexanedicarboxylic acid or 1,3-cyclohexanedicarboxylic acid, a linear, branched, or cyclic aliphatic dicarboxylic acid component such as phthalic acid, sebacic acid, succinic acid, isodecylsuccinic acid, maleic acid, fumaric acid, adipic acid, glutaric acid, or azelaic acid, but specific examples of the aliphatic dicarboxylic acid are not limited thereto.

Meanwhile, the dicarboxylic acid component may include 50 to 100 mol % terephthalic acid in some embodiments and 70 to 100 mol % of terephthalic acid in other embodiments; and 0 to 50 mol %, and 0 to 30 mol % in other embodiments of one or more dicarboxylic acids selected from the group consisting of aromatic dicarboxylic acids and aliphatic dicarboxylic acids. If the content of terephthalic acid in the dicarboxylic acid component is too low or high, physical properties of the polyester resin, such as heat resistance, chemical resistance or weather resistance, may be adversely affected.

Meanwhile, the diol component used in the polyester synthesis may include 5 to 60 mol % of dianhydrohexitol, 5 to 80 mol % of cyclohexanedimethanol, and a residual amount of other diol compounds.

The diol component preferably contains isosorbide (1,4:3,6-dianhydroglucitol) as dianhydrohexitol, thereby improving physical properties of chemical resistance as well as heat resistance of the polyester resin to be prepared. As the content of cyclohexanedimethanol (e.g., 1,2-cyclohexanedimethanol, 1,3-cyclohexanedimethanol or 1,4-cyclohexanedimethanol) is increased in the diol component, impact resistance of the polyester resin to be prepared may be greatly increased.

In addition, the diol component may further include an other diol component, in addition to isosorbide and cyclohexanedimethanol. The 'other diol component' is a diol component excluding isosorbide and cyclohexanedimethanol, and for example, may be aliphatic diol, aromatic diol, or a mixture thereof.

In the polyester copolymer, the diol component may further include one or more selected from the group consisting of compounds represented by Chemical Formulae 1, 2, and 3:

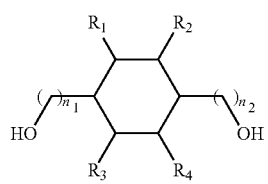
[Chemical Formula 1]

wherein $R_1$, $R_2$, $R_3$ and $R_4$ are each independently hydrogen or a substituted or unsubstituted alkyl group having 1 to 5 carbon atoms, and $n_1$ and $n_2$ are each independently an integer of 0 to 3;

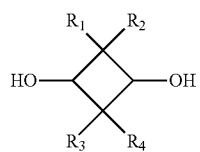
[Chemical Formula 2]

wherein $R_1$, $R_2$, $R_3$ and $R_4$ are each independently hydrogen or a substituted or unsubstituted alkyl group having 1 to 5 carbon atoms;

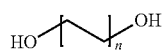
[Chemical Formula 3]

wherein n is an integer of 1 to 7.

As described above, the diol component of the polyester resin may include 5 to 60 mol % of dianhydrohexitol. If the content of dianhydrohexitol in the diol component is less than 5 mol %, heat resistance or chemical resistance of the polyester resin to be prepared will be insufficient, and melting viscosity property of the polyester resin may be not obtained. Further, if the content of dianhydrohexitol is more than 60 mol %, appearance of the polyester resin or product may be adversely affected or yellowing may occur.

Further, the polyester copolymer may have a weight average molecular weight of 50,000 to 60,000 and a glass transition temperature of 105 to 125° C.

The polyester resin may be provided by a method of preparing the polyester resin including the steps of esterifying a diol component containing 5 to 60 mol % of isosorbide as dianhydrohexitol, 5 to 80 mol % of cyclohexanedimethanol, and a residual amount of other diol compound with a dicarboxylic acid component containing terephthalic acid; adding a phosphorus-based stabilizer at the time when the degree of esterification reaches at least 80%; and subjecting the esterification product to polycondensation.

According to an embodiment of the method of preparing the polyester resin, a catalyst including a zinc compound is used for the esterification reaction, a phosphorus-based stabilizer is added to the reaction solution at the end of the esterification reaction, for example, at the time when the degree of esterification reaches at least 80%, and the resulting esterification product is subjected to polycondensation, thereby providing a polyester resin that exhibits physical properties of high heat resistance, flame retardancy, and impact resistance, and has excellent appearance, high transparency and excellent molding properties.

Detailed descriptions of the dicarboxylic acid component containing terephthalic acid, cyclohexanedimethanol, isosorbide and other diol compound are the same as described above.

The esterification reaction between the dicarboxylic acid components and the diol components may be carried out at a pressure of 0 to 10.0 kg/cm$^2$ and a temperature of 150 to 300° C. The esterification reaction conditions may be appropriately varied depending on specific characteristics of the final polyester, the molar ratio between the dicarboxylic acid components and glycol, or processing conditions. Exemplary conditions for the esterification reaction include a pressure of 0 to 5.0 kg/cm$^2$, or 0.1 to 3.0 kg/cm$^2$; and a temperature of 200 to 270° C., or 240 to 260° C.

The esterification reaction may be carried out in a batch or continuous manner. The respective raw materials may be separately added, or they are added in the form of slurry by mixing the diol components with the dicarboxylic acid components. The slurry may be prepared by dissolving the diol components such as dianhydrohexitol in the form of a solid at room temperature in water or ethylene glycol, and then mixing the solution with the dicarboxylic acid components containing terephthalic acid. Alternatively, the slurry may be prepared by melting dianhydrohexitol at 60° C. or higher, and then mixing the molten dianhydrohexitol with the dicarboxylic acid components containing terephthalic acid and other diol component. Water may be further added to the slurry of the dicarboxylic acid components and the copolymerized diol components of dianhydrohexitol and ethylene glycol, thereby enhancing the flowability of the slurry.

The molar ratio between the dicarboxylic acid components and the diol components participating in the esterification reaction may be 1:1.05 to 1:3.0. If the molar ratio of dicarboxylic acid component:diol component is less than 1:1.05, the dicarboxylic acid components may remain unreacted after polymerization, causing poor transparency of the resin. On the contrary, if the molar ratio exceeds 1:3.0, the polymerization rate may be lowered or the productivity of the resin may be adversely affected.

The polycondensation reaction step of the esterification products may include the step of reacting the esterification products of the dicarboxylic acid component and the diol component at a temperature of 150 to 300° C. and a reduced pressure of 600 to 0.01 mmHg for 1 to 24 hours.

The polycondensation reaction may be carried out at temperature ranges of 150 to 300° C., 200 to 290° C., or 260 to 280° C., and at reduced pressure ranges of 600 to 0.01 mmHg, 200 to 0.05 mmHg, or 100 to 0.1 mmHg. The reduced pressure condition of the polycondensation reaction enables the removal of glycol, which is a by-product of the polycondensation reaction, from the system. If the polycondensation reaction is carried out outside the reduced pressure range of 400 to 0.01 mmHg, removal of the by-product may be insufficient.

If the polycondensation reaction is carried out outside the temperature range of 150 to 300° C., that is, if the polycondensation reaction is carried out at a temperature of 150° C. or lower, glycol which is a by-product of the polycondensation reaction cannot be effectively removed from the system, and as a result, the intrinsic viscosity of the final reaction product may be lowered, which adversely affects the physical properties of the polyester resin, and if the reaction is carried out at a temperature of 300° C. or higher, there is a high possibility that yellowing may occur on appearance of the polyester resin. The polycondensation reaction may be carried out for a time necessary for the intrinsic viscosity of the final reaction product to reach an appropriate level, for example, for an average retention time of 1 to 24 hours.

The method of preparing the polyester resin composition may further include the step of adding a polycondensation catalyst. The polycondensation catalyst may be added to the esterification or transesterification reaction product before initiation of the polycondensation reaction. Alternatively, the polycondensation catalyst may be added to a slurry mixture containing the diol components and the dicarboxylic acid components before or during the esterification reaction.

As the polycondensation catalyst, a titanium compound, a germanium compound, an antimony compound, an aluminum compound, a tin compound, or a mixture thereof may be used. Examples of the titanium compound and the germanium compound are the same as those described above.

Meanwhile, the polymer composition according to the present disclosure includes one or more copolymers selected from the group consisting of an unsaturated nitrile-diene-based rubber-aromatic vinyl graft copolymer, an alkylmethacrylate-diene-based rubber-aromatic vinyl graft copolymer, and an alkyl methacrylate-silicone/alkylacrylate graft copolymer.

The unsaturated nitrile-diene-based rubber-aromatic vinyl graft copolymer may be a core-shell rubber, in which its average particle size may be 0.01 to 5 μm, its graft ratio may be 5 to 90%, a glass transition temperature of the core may be −20° C. or lower, and a glass transition temperature of the shell may be 20° C. or higher.

The unsaturated nitrile-diene-based rubber-aromatic vinyl graft copolymer is a core-shell rubber prepared by an emulsion polymerization or bulk polymerization process, in which its average particle size may be 0.01 to 5 μm, its graft ratio may be 5 to 90%, a glass transition temperature of the core may be −20° C. or lower, and a glass transition temperature of the shell may be 20° C. or higher, and optionally, the shell may contain or not a functional group such as glycidyl methacrylate or maleic anhydride.

In the unsaturated nitrile-diene-based rubber-aromatic vinyl graft copolymer, the unsaturated nitrile may be one or more selected from the group consisting of acrylonitrile, methacrylonitrile, ethacrylonitrile, phenylacrylonitrile, and α-chloroacrylonitrile.

In the above graft copolymers, the diene-based rubber may be a butadiene-type rubber or an isoprene-type rubber.

Furthermore, in the above graft copolymers, the aromatic vinyl may be one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

The core-shell rubbers may optionally have a morphology with a monomodal distribution of an average particle size of 0.01 to 5 μm or a morphology with a multimodal distribution of an average particle size of 0.01 to 5 μm.

Further, the alkylmethacrylate may be one or more selected from the group consisting of methyl methacrylate, ethyl methacrylate, propyl methacrylate, isopropyl methacrylate, and butyl methacrylate.

The unsaturated nitrile-diene-based rubber-aromatic vinyl graft copolymer may be an acrylonitrile-butadiene-styrene graft copolymer, and the alkylmethacrylate-diene-based rubber-aromatic vinyl graft copolymer may be a methyl methacrylate-butadiene-styrene graft copolymer. Furthermore, the alkylmethacrylate-silicone/alkylacrylate graft copolymer may be a methyl methacrylate-silicone/butylacrylate graft copolymer.

Meanwhile, the polycarbonate may have a glass transition temperature of 50 to 200° C. and a weight average molecular weight of 10,000 to 200,000.

Further, the polytrimethyleneterephthalate may have a weight average molecular weight of 10,000 to 150,000.

The polymer composition may further include one or more selected from the group consisting of an unsaturated nitrile-aromatic vinyl-glycidyl methacrylate-based compatibilizer, an unsaturated nitrile-aromatic vinyl-maleic anhydride-based compatibilizer, a saturated ethylene-alkylacrylate-glycidyl methacrylate-based compatibilizer, and a carbodiimide-based anti-hydrolysis agent.

In this regard, the unsaturated nitrile-aromatic vinyl-glycidyl methacrylate-based compatibilizer may be included in an amount of 15% by weight or less, the unsaturated nitrile-aromatic vinyl-maleic anhydride-based compatibilizer in an amount of 15% by weight or less, the saturated ethylene-alkylacrylate-glycidyl methacrylate-based compatibilizer in an amount of 15% by weight or less, and the carbodiimide-based anti-hydrolysis agent in an amount of 10% by weight or less.

The alkylacrylate may be one or more selected from the group consisting of methyl acrylate, ethyl acrylate, propyl acrylate, isopropyl acrylate, butyl acrylate, hexyl acrylate, octyl acrylate and 2-ethylhexyl acrylate.

Further, the unsaturated nitrile-aromatic vinyl-glycidyl methacrylate-based compatibilizer may have a glass transition temperature of 20 to 200° C. and a weight average molecular weight of 200 to 300,000, and optionally, it may be replaced by aromatic vinyl-glycidyl methacrylate.

The unsaturated nitrile-aromatic vinyl-maleic anhydride-based compatibilizer may have a glass transition temperature of 20 to 200° C. and a weight average molecular weight of 200 to 300,000, and the saturated ethylene-alkylacrylate-glycidyl methacrylate-based compatibilizer may have a glass transition temperature of −150 to 200° C. and a weight average molecular weight of 200 to 300,000.

Further, the carbodiimide-based anti-hydrolysis agent may have a weight average molecular weight of 50 to 300,000 and may be represented by the following Chemical Formula 4 or Chemical Formula 5:

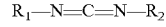 [Chemical Formula 4]

wherein $R_1$ and $R_2$ are each independently a hydrogen atom, an alkyl group having 1 to 20 carbon atoms or an aryl group having 6 to 36 carbon atoms;

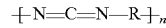 [Chemical Formula 5]

wherein R is an alkyl group having 1 to 20 carbon atoms or an aryl group having 6 to 36 carbon atoms, and n is an integer of 2 to 30,000 and represents an average degree of polymerization.

Meanwhile, the polymer composition may further include 0.1 to 10 parts by weight of a phosphite-based antioxidant as one or more additives selected from the group consisting of an antioxidant, a lubricant, a phenolic primary antioxidant, and a phosphite-based secondary antioxidant, based on 100 parts by weight of the resin composition which consists of 10 to 20% by weight of a polyester copolymer including a residue of a dicarboxylic acid component containing terephthalic acid and a residue of a diol component containing dianhydrohexitol; 15 to 25% by weight of polytrimethyleneterephthalate; 10 to 20% by weight of one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer; and 50 to 65% by weight of polycarbonate.

Further, the hindered phenolic antioxidant may have a weight average molecular weight of 50 to 300,000.

The phosphite-based antioxidant may have a structural formula of the following Chemical Formula 6:

[Chemical Formula 6]

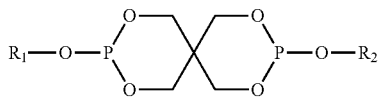

wherein $R_1$ and $R_2$ are each independently a substituted or unsubstituted alkyl group having 1 to 40 carbon atoms or a substituted or unsubstituted aryl group having 6 to 40 carbon atoms.

The lubricant may be one or more selected from the group consisting of a metal stearate-based lubricant, an amide-based lubricant, a paraffin-based lubricant, and an ester-based lubricant.

Hereinafter, preferred examples of the present disclosure will be explained in more detail. However, these examples are provided for illustrative purposes and are not intended to limit the scope of the present disclosure.

EXAMPLE 1

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 10% by weight of terephthalic acid-isosorbide-1,4-cyclohexanediol-ethylene glycol copolymer polyester (Tg: 110° C., weight average molecular weight: 55000), 15% by weight of polytrimethyleneterephthalate, 10% by weight of acrylonitrile-butadiene-styrene graft copolymer, and 65% by weight of polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the polytrimethyleneterephthalate was PTT available from SK Chemicals, the acrylonitrile-butadiene-styrene graft copolymer was a core-shell rubber-type graft ABS, HR-181 available from Kumho Petrochemical Co., the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), and the phosphite-based secondary antioxidant was Irgafos 168 available from Clariant (Switzerland).

EXAMPLE 2

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 10% by weight of terephthalic acid-isosorbide-1,4-cyclohexanediol-ethylene glycol copolymer polyester (Tg: 110° C., weight average molecular weight: 55000), 20% by weight of polytrimethyleneterephthalate, 10% by weight of acrylonitrile-butadiene-styrene graft copolymer, and 60% by weight of polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the polytrimethyleneterephthalate was PTT available from SK Chemicals, the acrylonitrile-butadiene-styrene graft copolymer was a core-shell rubber-type graft ABS, HR-181 available from Kumho Petrochemical Co., the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), and the phosphite-based secondary antioxidant was S-9228 available from DOVER Chemical Corp. (USA).

EXAMPLE 3

0.5% by weight of acrylonitrile-styrene-glycidyl methacrylate, 0.3% by weight of a carbodiimide-based anti-hydrolysis agent, 0.2% by weight of a phenolic primary antioxidant, and 0.2% by weight of a phosphite-based secondary antioxidant were added, based on 100% by weight of a resin consisting of 10% by weight of terephthalic acid-isosorbide-1,4-cyclohexanediol-ethylene glycol copolymer polyester (Tg: 110° C., weight average molecular weight: 55000), 25% by weight of polytrimethyleneterephthalate, 10% by weight of acrylonitrile-butadiene-styrene graft copolymer, and 55% by weight of polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the polytrimethyleneterephthalate was PTT available from SK Chemicals, the acrylonitrile-butadiene-styrene graft copolymer was a core-shell rubber-type graft ABS, HR-181 available from Kumho Petrochemical Co., the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), the phosphite-based secondary antioxidant was S-9228 available from DOVER Chemical Corp. (USA), and the carbodiimide-based anti-hydrolysis agent was 9000 available from Raschig GmbH (Germany).

EXAMPLE 4

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 15% by weight of terephthalic acid-isosorbide-1,4-cyclohexanediol-ethylene glycol copolymer polyester (Tg: 110° C., weight average molecular weight: 55000), 25% by weight of polytrimethyleneterephthalate, 10% by weight of acrylonitrile-butadiene-styrene graft copolymer, and 50% by weight of polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the polytrimethyleneterephthalate was PTT available from SK Chemicals, the acrylonitrile-butadiene-styrene graft copolymer was a core-shell rubber-type graft ABS, HR-181 available from Kumho Petrochemical Co., the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), and the phosphite-based secondary antioxidant was Irgafos 168 available from Clariant (Switzerland).

EXAMPLE 5

0.5% by weight of acrylonitrile-styrene-glycidyl methacrylate, 0.2% by weight of a phenolic primary antioxidant, and 0.2% by weight of a phosphite-based secondary antioxidant were added, based on 100% by weight of a resin consisting of 13% by weight of terephthalic acid-isosorbide-1,4-cyclohexanediol-ethylene glycol copolymer polyester (Tg: 110° C., weight average molecular weight: 55000), 25% by weight of polytrimethyleneterephthalate, 10% by weight of methyl methacrylate-butadiene-styrene graft copolymer, and 52% by weight of polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the polytrimethyleneterephthalate was PTT available from SK Chemicals, the methyl methacrylate-butadiene-styrene graft copolymer was a core-shell rubber-type graft MBS, M-511 available from KANEKA Co. (Japan), the polycarbonate was 3030PJ available from Samyang Corp. (Korea), the acrylonitrile-styrene-glycidyl methacrylate was SAG-005 available from SUNNY FC (China), the phenolic primary antioxidant was AO-60 available from ADEKA Corp. (Japan), and the phosphite-based secondary antioxidant was Irgafos 168 available from Clariant (Switzerland).

COMPARATIVE EXAMPLES 1 TO 5

The conventional heat resistant ABS and PC/ABS products were used for comparison as follows.

Comparative Example 1: high-load (1.82 MPa) ABS product having heat resistance of 95° C.
Comparative Example 2: high-load (1.82 MPa) ABS product having heat resistance of 100° C.
Comparative Example 3: PC/ABS product having 50% polycarbonate content
Comparative Example 4: PC/ABS product having 60% polycarbonate content
Comparative Example 5: PC/ABS product having 70% polycarbonate content

EXPERIMENTAL EXAMPLE

Test of Physical Properties of Molded Articles Manufactured from Polymer Composition The pellets prepared according to Examples 1 to 5 and Comparative Examples 1 to 5 were injected using an injection machine at a barrel temperature of 250° C. under the same conditions, and then the injected test samples were adjusted under conditions of 23±2° C. and a relative humidity of 50±5%. Their mechanical properties were measured as follows. The test results are given in the following Tables 1 to 2.

Experimental Example 1

Test of Impact Strength

In accordance with ASTM D 256, test samples were prepared, and their impact strength was measured using an Izod impact tester (Toyoseiki).

Experimental Example 2

Test of Tensile Property

In accordance with ASTM D 638, test samples were prepared, and their tensile strength and elongation were measured using a universal testing machine (Zwick Roell Z010).

Experimental Example 3

Test of Flexural Property

In accordance with ASTM D 790, test samples were prepared, and their flexural strength and flexural modulus were measured using a universal testing machine (Zwick Roell Z010).

Experimental Example 4

Test of Heat Resistance

In accordance with ASTM D 648, test samples were prepared, and their heat resistance was measured using a heat resistance tester (HDT Tester, Toyoseiki).

Experimental Example 5

Test of Chemical Resistance of Molded Articles Manufactured from Polymer Composition The pellets prepared according to Examples 1 to 5 and Comparative Examples 1 to 5 were injected using an injection machine at a barrel temperature of 250° C. under the same conditions, and then the injected tensile strength samples were adjusted under conditions of 23±2° C. and a relative humidity of 50±5% for 24 hours. Evaluation was performed in accordance with the following method.

① An experimental fixture for a chemical resistance test was manufactured to have a strain of 2.0%, and a tensile test sample was fixed in the experimental fixture.

② An air freshener was applied to the tensile test sample for 1 minute, and then left at 23±2° C. for 168 hr.

③ After 168 hr at 23±2° C., the tensile test sample was removed from the experimental fixture, and then left at 23±2° C. for about 1~2 hr.

④ After left for about 1~2 hr as above, the surface of the tensile test sample, to which the air freshener had been applied, was observed under an optical microscope to measure crack width, followed by evaluation of chemical resistance.

Experimental Example 6

Measurement of Crack Width by Optical Microscopy

The surface of the tensile test sample, to which the air freshener had been applied, was observed under an optical microscope (Huvitz Lusis HC-30MU) to measure crack width.

In this regard, as the air freshener, a commercially available car air freshener was selected and used.

TABLE 1

| | | Example | | | | |
|---|---|---|---|---|---|---|
| Section | Unit | 1 | 2 | 3 | 4 | 5 |
| Izod impact strength (1/8") | J/m | 775 | 730 | 770 | 750 | 760 |
| Izod impact strength (1/4") | J/m | 432 | 432 | 432 | 432 | 432 |
| Tensile strength | kg/cm² | 530 | 520 | 510 | 510 | 510 |
| Elongation | % | 120 | 125 | 115 | 116 | 113 |
| Heat resistance (1.82 MPa) | ° C. | 116 | 112 | 105 | 100 | 102 |
| Flexural strength | kg/cm² | 860 | 850 | 830 | 820 | 825 |
| Flexural modulus | kg/cm² | 23,000 | 22,500 | 22,000 | 21,500 | 21,800 |
| Chemical resistance | | Result | | | | |
| Crack width (μm) | | less than 10 | less than 10 | less than 10 | less than 10 | less than 10 |

TABLE 2

| | | Comparative Example | | | | |
|---|---|---|---|---|---|---|
| Section | Unit | 1 | 2 | 3 | 4 | 5 |
| Izod impact strength (1/8") | J/m | 250 | 240 | 600 | 550 | 650 |
| Izod impact strength (1/4") | J/m | 210 | 180 | 500 | 450 | 550 |
| Tensile strength | kg/cm² | 470 | 475 | 440 | 550 | 550 |
| Elongation | % | 20 | 20 | 110 | 100 | 105 |
| Heat resistance (1.82 MPa) | ° C. | 95 | 100 | 100 | 105 | 110 |
| Flexural strength | kg/cm² | 630 | 650 | 600 | 780 | 780 |
| Flexural modulus | kg/cm² | 21,000 | 21,500 | 17,000 | 22,000 | 22,000 |
| Chemical resistance | | Result | | | | |
| Crack width (μm) | | Fracture | Fracture | Fracture | Fracture | Fracture |

As shown in the above measurement results, Examples showed excellent heat resistance, impact resistance, and chemical resistance or resistance to environmental stress cracking, compared to Comparative Examples, indicating that the polymer composition according to the present disclosure exhibits physical properties of improved heat resistance or impact resistance, and also excellent resistance to environmental stress cracking, while the components thereof are environmentally friendly.

Although specific parts of the present disclosure have been described in detail, it will be apparent to those skilled in the art that these specific descriptions are provided for preferred embodiment and the scope of the present disclosure is not limited thereby. Therefore, the scope of the present disclosure should be defined only by the accompanying claims and equivalents thereof.

What is claimed is:

1. A chemical resistant polymer composition for a center fascia, comprising:
   a resin composition consisting of 10 to 20% by weight of a polyester copolymer containing a residue of a dicarboxylic acid component containing terephthalic acid and a residue of a diol component containing dianhydrohexitol;
   15 to 25% by weight of polytrimethyleneterephthalate;
   10 to 20% by weight of one or more copolymers selected from the group consisting of an unsaturated nitrile-diene-based rubber-aromatic vinyl graft copolymer, an alkylmethacrylate-diene-based rubber-aromatic vinyl graft copolymer, and an alkylmethacrylate-silicone/alkylacrylate graft copolymer;
   50 to 65% by weight of polycarbonate based on the weight of the resin composition; and
   0.1 to 10 parts by weight of a phosphite-based antioxidant, based on 100 parts by weight of the resin composition.

2. The chemical resistant polymer composition for a center fascia of claim 1, wherein the polyester copolymer has a weight average molecular weight of 50,000 to 60,000, and a glass transition temperature of 105 to 125° C.

3. The chemical resistant polymer composition for a center fascia of claim 1, wherein in the polyester copolymer, the dicarboxylic acid component further includes one or more selected from the group consisting of aromatic dicarboxylic acids having 8 to 20 carbon atoms and aliphatic dicarboxylic acids having 4 to 20 carbon atoms.

4. The chemical resistant polymer composition for a center fascia of claim 1, wherein in the polyester copolymer, the dianhydrohexitol is isosorbide.

5. The chemical resistant polymer composition for a center fascia of claim 1, wherein in the polyester copolymer, the content of dianhydrohexitol is 5 to 60 mol %, based on the total content of the diol component.

6. The chemical resistant polymer composition for a center fascia of claim 1, wherein in the polyester copolymer, the diol component further includes one or more selected from the group consisting of compounds represented by the following Chemical Formulae 1, 2, and 3:

[Chemical Formula 1]

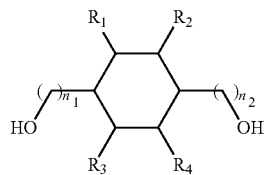

wherein $R_1$, $R_2$, $R_3$ and $R_4$ are each independently hydrogen or a substituted or unsubstituted alkyl group having 1 to 5 carbon atoms, and $n_1$ and $n_2$ are each independently an integer of 0 to 3;

[Chemical Formula 2]

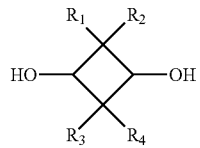

wherein $R_1$, $R_2$, $R_3$ and $R_4$ are each independently hydrogen or a substituted or unsubstituted alkyl group having 1 to 5 carbon atoms;

[Chemical Formula 3]

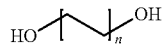

wherein n is an integer of 1 to 7.

7. The chemical resistant polymer composition for a center fascia of claim 1, wherein in the polyester copolymer, the diol component further includes 1,4-cyclohexanediol and ethylene glycol.

8. The chemical resistant polymer composition for a center fascia of claim 1, wherein the polytrimethyleneterephthalate has Intrinsic Viscosity of 0.8 to 1.0.

9. The chemical resistant polymer composition for a center fascia of claim 1, wherein the unsaturated nitrile-diene-based rubber-aromatic vinyl graft copolymer is a core-shell rubber, having an average particle size is 0.01 to 5 μm, a graft ratio is 5 to 90%, a glass transition temperature of the core of −20° C. or lower, and a glass transition temperature of the shell of 20° C. or higher.

10. The chemical resistant polymer composition for a center fascia of claim 1, wherein in the unsaturated nitrile-diene-based rubber-aromatic vinyl graft copolymer, unsaturated nitrile is one or more selected from the group consisting of acrylonitrile, methacrylonitrile, ethacrylonitrile, phenylacrylonitrile, and α-chloroacrylonitrile.

11. The chemical resistant polymer composition for a center fascia of claim 1, wherein in the graft copolymer, the diene-based rubber is a butadiene rubber or an isoprene rubber.

12. The chemical resistant polymer composition for a center fascia of claim 1, wherein in the graft copolymer, aromatic vinyl is one or more selected from the group consisting of styrene, α-methyl styrene vinyltoluene, t-butyl styrene, halogen-substituted styrene, 1,3-dimethyl styrene, 2,4-dimethyl styrene, and ethyl styrene.

13. The chemical resistant polymer composition for a center fascia of claim 1, wherein the alkylmethacrylate-diene-based rubber-aromatic vinyl graft copolymer is a methyl methacrylate-butadiene-styrene graft copolymer.

14. The chemical resistant polymer composition for a center fascia of claim 1, wherein the polycarbonate has a glass transition temperature of 130 to 160° C. and a weight average molecular weight of 20,000 to 60,000.

15. The chemical resistant polymer composition for a center fascia of claim 1, further comprising one or more selected from the group consisting of an unsaturated nitrile-aromatic vinyl-glycidyl methacrylate-based compatibilizer and an unsaturated nitrile-aromatic vinyl-maleic anhydride-based compatibilizer.

16. The chemical resistant polymer composition for a center fascia of claim 1, wherein the phosphite-based antioxidant is represented by the following Chemical Formula 6:

[Chemical Formula 6]

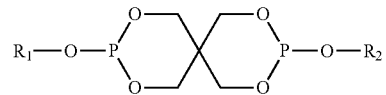

wherein $R_1$ and $R_2$ are each independently a substituted or unsubstituted alkyl group having 1 to 40 carbon atoms or a substituted or unsubstituted aryl group having 6 to 40 carbon atoms.

17. The chemical resistant polymer composition for a center fascia of claim 1, further comprising one or more additives selected from the group consisting of a lubricant, a phenolic primary antioxidant, and a phosphite-based secondary antioxidant.

* * * * *